United States Patent
Wurm

[15] 3,639,251
[45] Feb. 1, 1972

[54] LIQUID DYE FILTERS WITH NARROW PASSBANDS

[72] Inventor: Karl Wurm, Oberaudorf/Inn, Germany

[73] Assignee: The United states of America as represented by the Secretary of the Air Force

[22] Filed: July 22, 1968

[21] Appl. No.: 746,467

[52] U.S. Cl. ........................................ 252/300, 350/312
[51] Int. Cl. ............................................... G02b 5/24
[58] Field of Search ........................... 350/312; 252/300

[56] References Cited

UNITED STATES PATENTS 3,370,902  2/1968  Allinikov ........................... 252/300

Primary Examiner—Charles E. Van Horn
Assistant Examiner—J. P. Branner
Attorney—Harry A. Herbert, Jr. and Arsen Tashjian

[57] ABSTRACT

Liquid dye filters for passing narrow spectral bands in astrophysical observations where combinations of various compounds in solution in methanol and acetone are used as dyes in thin layers between Pyrex glass plates to produce a homogeneous filter which selectively absorbs the major portion of the spectrum in and near visible light allowing only a narrow band in the λ3,000 to λ4,500 A. range to pass.

3 Claims, 17 Drawing Figures

INVENTOR.
KARL WURM
BY Harry A. Herbert Jr.
and Arsen Tashjian
ATTORNEYS

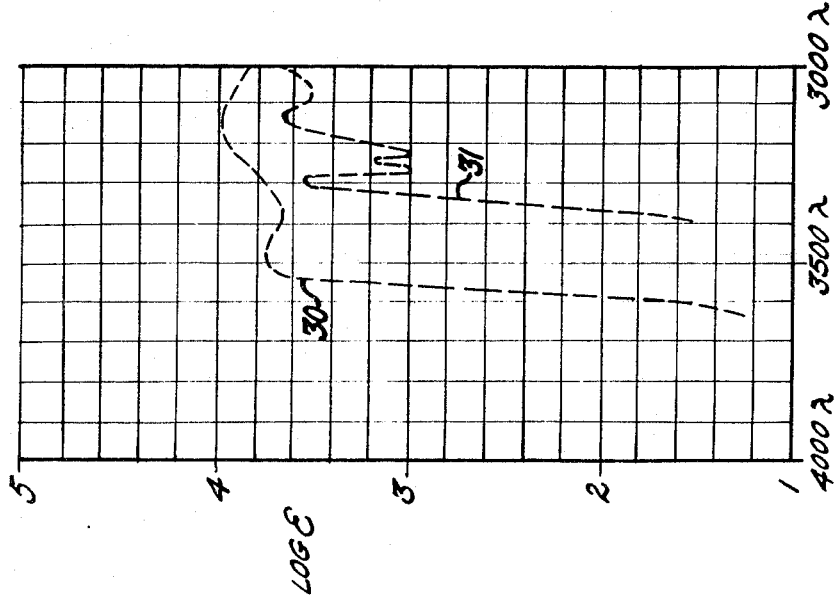
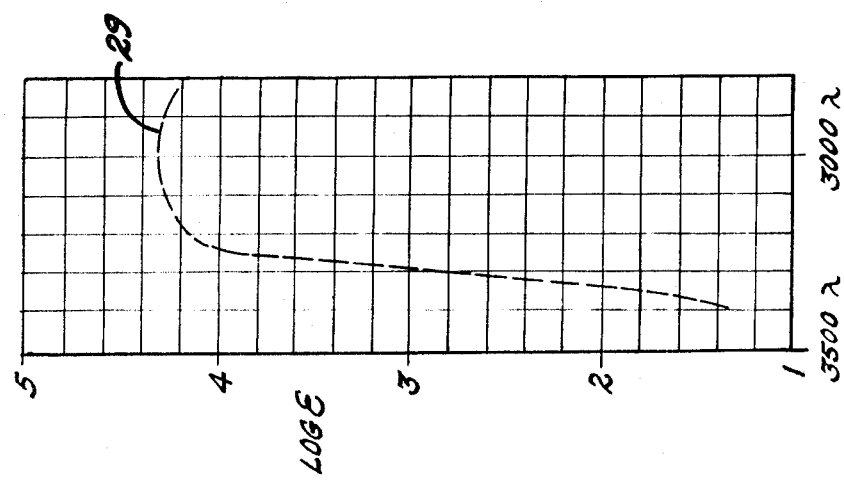
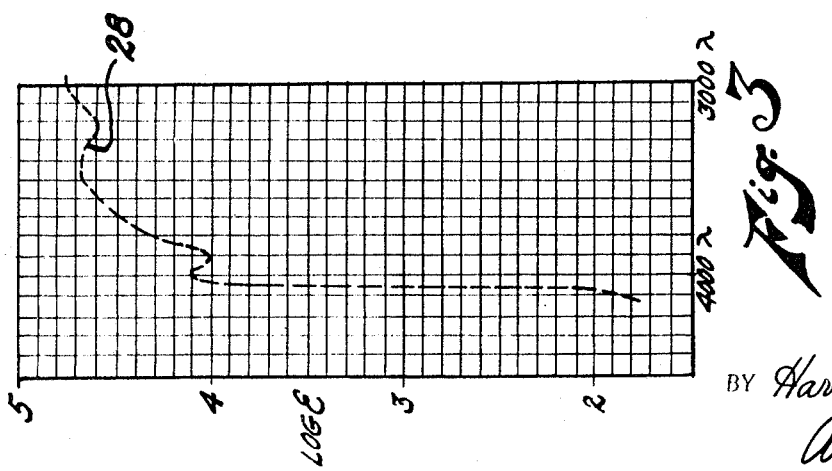

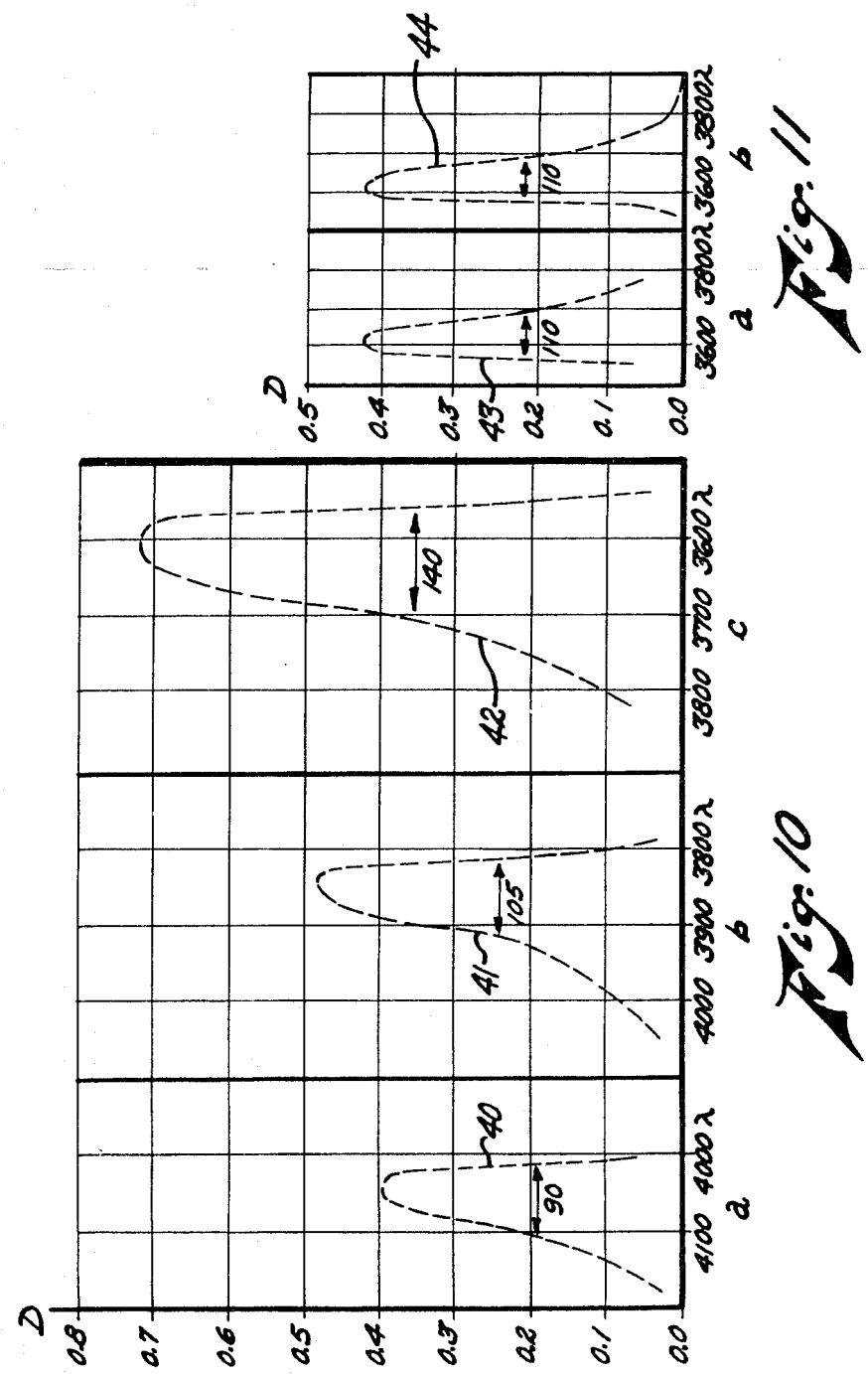

a: OBSERVED
b: COMPUTED

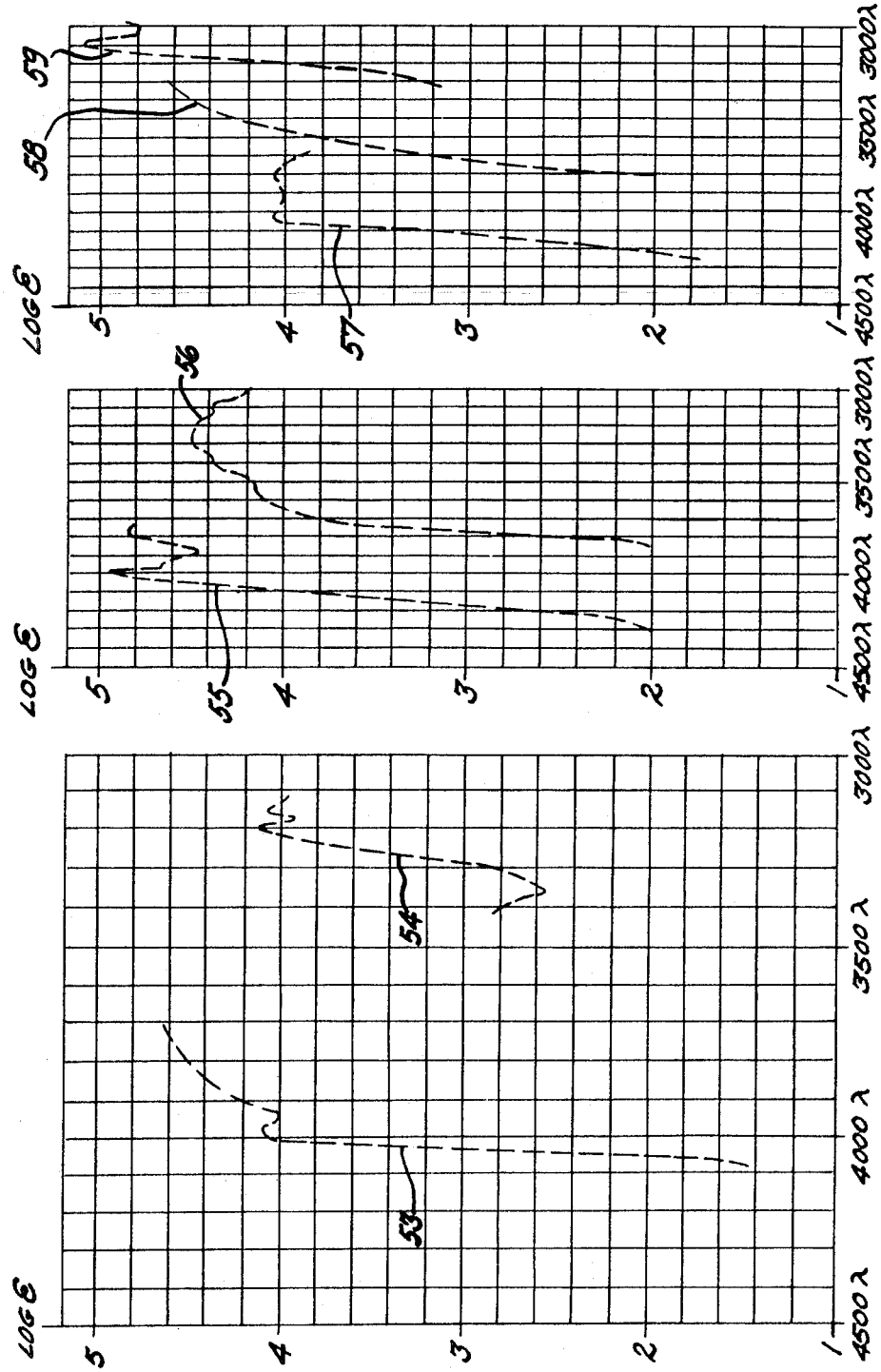

LIQUID DYE FILTERS WITH NARROW PASSBANDS

BACKGROUND OF THE INVENTION

This invention relates to optical filters of light-absorbtive materials and, more particularly, is concerned with providing a liquid dye filter having selective light transmission properties limited to an extremely narrow passband.

In the study of galactic nebulae, it is useful to investigate the properties of the most intense nebular emissions for the purpose of making a quantitative surface photometry of the emissions. Presently available interference filters, when used for this purpose, are not sufficiently accurate because of the large scatter of the peak transmission about the wavelengths for which they were intended. Also, the maximal transmission varies to a great extent over the surface of the filter. Furthermore, interference filters are particularly restricted in their applicability when operated in strongly convergent light. The passbands become strongly distorted and, with increasing convergence, the passband broadens and suffers a shift to shorter and shorter wavelengths finally splitting into two broad separated components. The severe lack of homogeneity of the available interference filters is caused by their restricted sizes and the property that they give in strongly convergent light only strongly distorted passbands. This situation necessitated the development of a filter type which is free of the mentioned disadvantages. Thus, it is evident that only a new approach, such as dyes in liquids, would provide the necessary narrow passband filters which would be useful to investigate the most intense nebular emissions, the well-known glass and gelatin color filters being of no use because their passbands are always much too wide.

SUMMARY OF THE INVENTION

The present invention provides filters which are particularly useful in the region of $\lambda 3,000$ to $\lambda 4,500$ Angstroms. This is the so-called blue-violet region and certain hydrocarbons and cyanine dyes and derivatives thereof have been found to be advantageous in the preparation of liquid filters for use in astrophysical observations with high-standard telescopes in this range. Very few of the compounds used for dyes are commercially available, therefore, the dyes had to be prepared experimentally in the laboratory.

In the selection and combination of the dyes for filters having a mixture of two dyes, the minima within the extinction curves of the compounds with broad absorption features are generally so shallow that it would be impossible to create a passband filter with them. However, the present invention describes a method of combining two particular types of compounds in a solution, giving them both the proper optical density.

It is well known that the gradients of extinction of dissolved compounds are generally much steeper on those branches where the extinction decreases from shorter to longer wavelength than on the other branches where the opposite is the case. The reason for this property is that in the absorption there is involved only a single oscillation level of the lower electronic state, whereas the electronic jump leads to many oscillation levels (with increasing energy) of the higher electronic state with a generally decreasing transition probability (Franck-Condon principle). The individual bands overlap to the violet and decrease slowly in intensity. However, there exist large differences in the steepness of the slopes. The procedure of the present invention of constructing absorption minima for filters includes the combining of dyes with extreme gradients descending to the red with those of the highest gradients descending to the violet. The transmission curves of the passbands made in this manner become unsymmetrical with the less steep slope to the red.

Accordingly, it is an object of the present invention to provide a narrow passband absorption filter utilizing liquid dyes.

Another object of the invention is to provide a narrow passband absorption filter having no scatter over the surface thereof of the peak transmission about a predetermined wavelength.

Still another object of the invention is to provide an absorption filter wherein the shape of the passband is homogeneous over the entire filter area and which operates perfectly in strongly convergent light.

A further object of the invention is to provide an absorption filter having a narrow passband for use in the study of monochromatic surface photometry of galactic nebulae.

A still further object of the invention is to provide a narrow passband absorption filter for use in the violet and blue region by using compounds of hydrocarbons, cyanine dyes and derivatives as the selective filtering or light-absorbing medium.

These and other objects, features and advantages will become more apparent after considering the description that follows and from the annexed drawings.

DESCRIPTION OF THE DRAWINGS

In the drawings:

FIG. 3 is a graph showing the extinction curve of $AR(X_1)$, an unidentified hydrocarbon, in methanol;

FIG. 4 is a graph indicating the absorption spectra of trans-stilbene in methanol;

FIG. 5 is a graph showing the transmission characteristics of peri-naphthindene in methanol and 1.2.3.6.7.8-hexahydropyrene in methanol;

FIG. 6 is a graph showing the extinction curves of anthanthren in acetone and 3:4–5:6-dibenzcarbazol in acetone;

FIG. 7 is a graph showing the transmission characteristics of perylen in acetone and 9-phenyl-3.4.5.6-dibenzfluorene in acetone;

FIG. 8 is a graph showing the absorption spectra of tetracen in acetone and 1.2-benzo-diphenylene-sulfide in acetone;

FIG. 9 shows a graph of the extinction curves of 3-methyl-pyrene in acetone and 10.11-benzofluorathene in acetone;

FIG. 10 is a graph showing the transmission of di-(2.4-dimethyl-5-carbathoxypyrryl-3)-methen-hydrochloride plus $AR(X_1)$ in acetone, Ste 283/49 plus anthracen in acetone, and Ste 283/49 plus perinaphthene in acetone;

FIG. 11 is a graph showing the transmission of characteristics of Ste 283/49 plus perinaphthene in acetone—layer 5 mm. (FIG. 11a is measured—FIG. 11b computed profile);

FIG. 15 is a pair of graphs showing characteristics of $AR(X_1)$ in tetrahydrofurane and chrysen in dioxan;

FIG. 16 is a pair of graphs showing characteristics of biacennaphthylidin in benzol and 1.2-di-$\beta$-naphthyl-athylen in dioxan; and FIG. 17 is a series of graphs showing the characteristics of 11.12-benzfluoranthen in carbon tetrachloride 2.2'.6'.2''-thernaphthyl in dioxan and 3.4,8.9-dibenzpyrene in carbon tetrachloride.

DESCRIPTION OF THE PREFERRED EMBODIMENTS

Before citing characteristic examples of filters according to the invention, the following is a presentation of an explanation of the transmission and extinction curves graphically shown in the attached drawings.

The coefficient of extinction E is generally defined by the following relation:

$$\log J_o/J = E\,cd \quad (1)$$

where log designates the common logarithm (base 10), $J_o$ the infalling intensity of the light, $J$ the intensity of the light after it has passed and absorbing material, $c$ designates the concentration of the substance (in mol/liter) and $d$ the thickness of the absorbing layer. The extinction $E$ as a function of the wavelength can be determined according to the relation of equation (1) from transmission measurements $J_o/J$, if the concentration $c$ as well as $d$ is known. The extinction curves shown on the attached graphs have all been measured although it should be mentioned that the absolute values of $E$ shown are often only approximately correct, which is not important with respect to the manner in which the data is being used.

Self-registering spectrophotometers were used to obtain the data for plotting the transmission curves from which extinction curves were derived and which gave a resolution in wavelengths of 15 to 20 Angstroms. In certain instances at particular points on the transmission curves where higher resolution was required, small parts of the spectrum were measured photographically with a high dispersion grating spectrograph.

It should be noted that the extinction curves herein presented include only the ones of the most promising substances considered. Many more compounds were investigated and found to be less effective than those herein disclosed.

Figure 1:
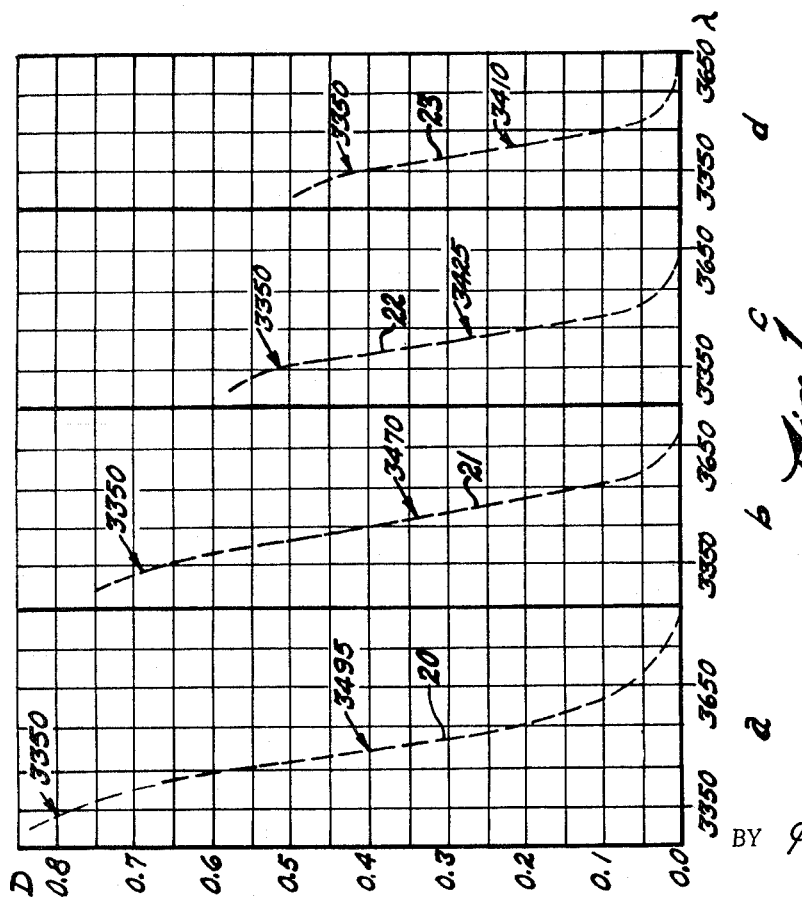
FIG. 1 is a graph showing the transmission of glutacon-diethylimid-perchlorate between $\lambda 3,300$ and $\lambda 3,700$ A. for four different concentrations in methanol—layer 10mm.
Figure 2:
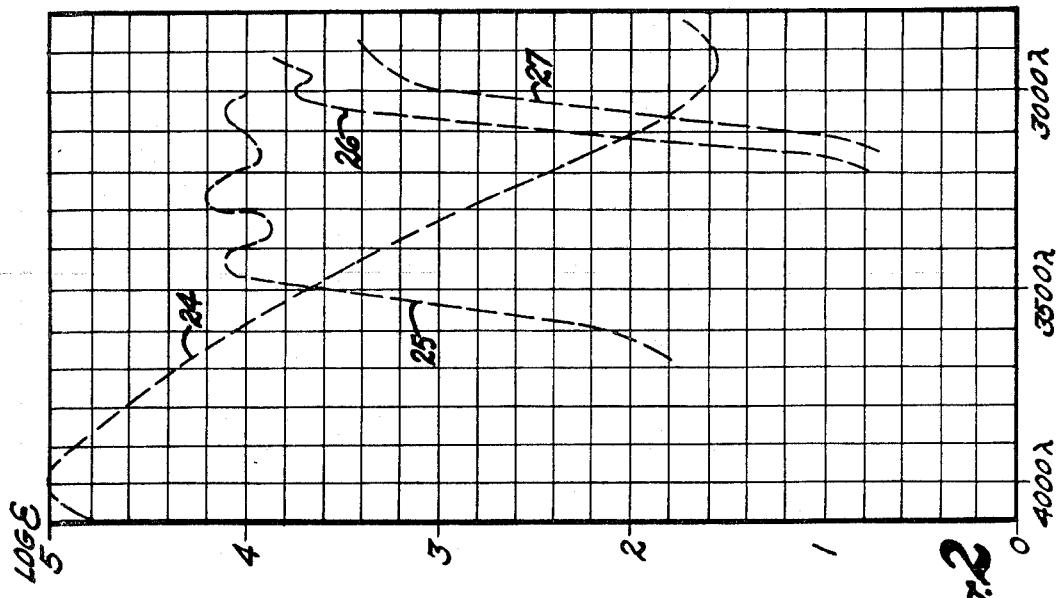
FIG. 2 is a graph showing the transmission characteristics of glutacon-diethylimid-perchlorate in methanol for the range between $\lambda 3,000$ and $\lambda 4,000$ A., benz-anthren in methanol, diphenylenoxyd in methanol, and methyl-benzotriazol in methanol.

In FIG. 1 there is shown portions of transmission curves 20, 21, 22 and 23 for four different concentrations of the compound glutacon-diethylimid-perchlorate in methanol for the limited range from λ3,300 to λ3,800 A. description of the method of producing the compound glutacon-diethylimid-perchlorate may be found in the publication Helvetica Chimica Acta 23 (1940) on pages 1,139–1,146, especially 1,143 explained by von G. Schwarzenbach and K. Lutz. In FIG. 2 and curve 24 is the extinction curve of the material of FIG. 1 for the range between λ3,000 and λ4,000 A. Log E decreases within this range by 3.4, thus, in the average for 100 Angstroms by 0.34. The gradient of E is strongest between λ3,100 and λ3,500 A. The portions of registrations by the spectrophotometer in figure 1 were used as the basis for deriving the extinction curve 24 in FIG. 2. Note that the direction of increasing wavelength of FIG. 1 is reversed in FIG. 2.

In the transmission curve 20 of FIG. 1 the transmission amounts at λ3,350 A. to D=0.8 and from this point to red it drops to half this value at λ3,495 A. From this it may be concluded that if the violet part of the spectrum could be cut off by a second dye absolutely sharp at λ3,350 A., the resultant filter would have a half width of only 150 Angstroms.

Figure 12:
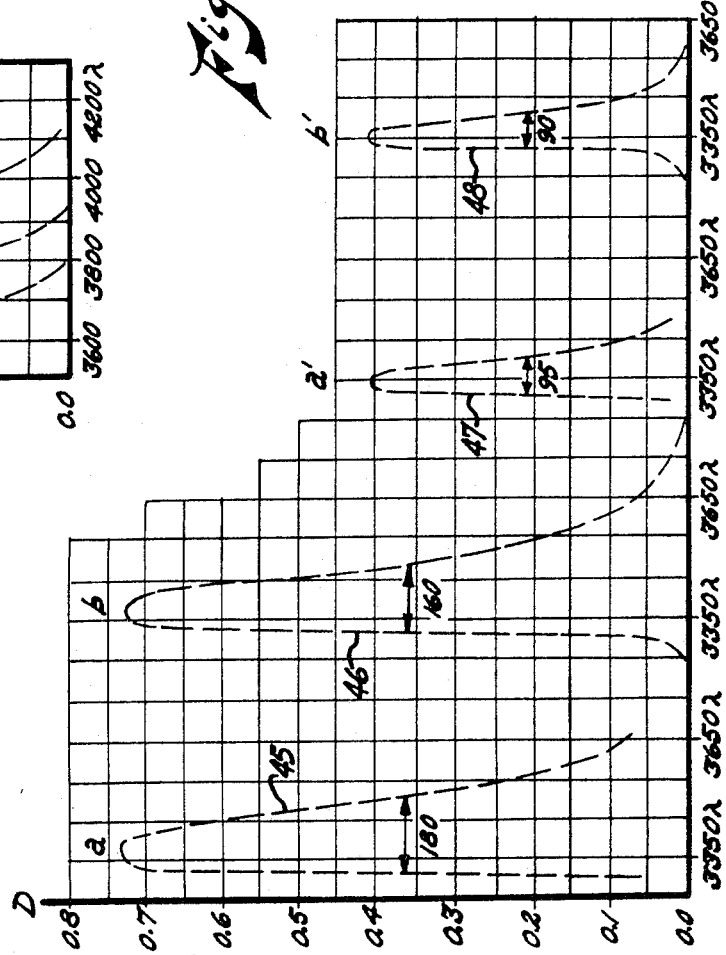
FIG. 12 is a series of graphs showing filters from glutacon-diethylimid-perchlorate plus tetrahydro-pyrene and trans-stilbene in methanol: acetone 4:1—layer 5 mm.

Although, for all practical purposes, there is no possibility of cutting off the spectrum in the aforementioned manner, it is possible to add another compound and obtain an extremely high gradient of extinction. The curves 45, 46, 47 and 48 of FIG. 12 show this characteristic. When adding to a solution of glutacon-diethylimid-perchlorate which has at λ3,350 A. a transmission D=0.8, a certain amount of 1.2.3.6.7.8.-hexahydro-pyrene in such a way that at λ3,350 A. the highest possible gradient is created, an absorption minimum of the shape given with the curve (a) 45 in FIG. 12 can be measured. The method of producing 1,2,3,6,7,8.-hexahydro-pyrene is described by J. W. Cook and C. L. Hewett in Jour. Chem. Soc. London (1933) on page 401. Between λ3,350 and λ3,380 A., the minimum has a transmission D of 72 percent and a half width of the passband of 180 Angstroms. Curve (a) 45 (the measured one) deviates slightly from curve (b) 46 which is computed from the extinction curves. The deviations are caused partly by small inaccuracies of the extinction curves and partly by the limited accuracy of the photometry. The curves (a') 47 and (b') 48 in FIG. 12 represent measured and computed shapes of the absorption minima when a peak transmission of about 0.4 is chosen. The half widths amount now to only 95 Angstrom units.

On the violet wing of the absorption minimum, a certain amount of trans-stilbene was added to the hexahydro-pyrene. The compound trans-stilbene is commercially available from Fluka AGea-Chem. Fabrik.-CH.9470 BUCHS, Switzerland and its production is described in Journal prakt. Chemie (2) 39, 45 (1889) by T. Curtins and R. Jay. The extinction curves of these last-mentioned dyes are shown in FIG. 5, curve 31, and in FIG. 4, curve 29. The addition of the trans-stilbene to the hexahydro-pyrene is effective to cover the double minimum of extinction of the latter around λ3,250 A.

Figure 13:
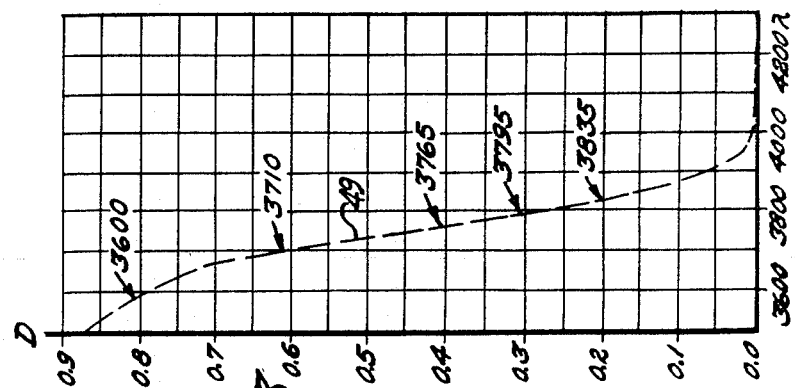
FIG. 13 is a graph showing the transmission of Ste 283/49 at one concentration level.
Figure 14:
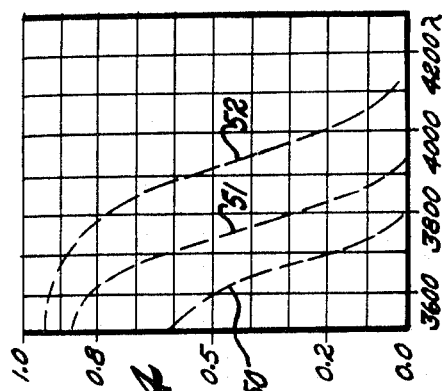
FIG. 14 is a series of graphs showing the transmission of Ste 283/49 at three other concentration levels.

Another example of a narrow passband dye is shown in FIGS. 13 and 14, curves 49, 50, 51 and 52, which are graphs of portions of the transmission curves of a material called Ste 283/49. This material functions in the manner as 1.1,5.5 tetracyano-pentadien-potassium shown in FIG. 11 which shows the absorption minimum for violet-wing absorption, the perinaphthindene of FIG. 5, curve 30. The curve 43, FIG. 11 is the measured and curve 44, FIG. 11 is the computed profile.

On the attached drawings there are found several different dyes which can be used as red-wing components for the construction of narrow passbands in the range λ3,000 to λ4,500 A. Although many of the compounds overlap within the range, the individual dye always serves best in that part of the extinction curve where the gradient is steepest. However, it should be noted that the operating area on this curve should not be too near the maximum because all absorption bands have rather limited extension to red and the light becomes again freely transmitted a few to several hundreds of Angstroms to the red from the absorption minima.

Other considerations in the use of filters in astrophysical observations include restrictions as to the choice of solvents and the thickness of the absorbing layers. Solvents which remain liquid and do not begin to crystallize out at lower temperatures must be chosen. Also, the thickness of the absorbing layer as well as that of the cell walls should be kept as small as possible, particularly with regard to use in the convergent beam of a wide-angle Schmidt camera.

These considerations require that the upper limit on layer thickness be placed at 10 mm. which was found to be acceptable and not harmful to the quality of the optical images in long focus instruments with $f$ equal or longer than 2 meters. In Schmidt cameras of shorter focus and with smaller focal ratios, the limit of layer thickness is set at 7.5 mm. and even thinner layers are used when possible. The filter is always placed as close as possible to the emulsion (plate or film) thereby reducing the influence of temperature variations during the exposure as well as inhomogeneities in the window plates. The windows may be constructed of Pyrex or similar material and should be of good optical quality.

Certain solvents in which the dyes are dissolved cause small shifts of the extinction curves from a few to about 50 to 60 Angstroms. When two or more dyes are mixed, the different shifts must be considered and in certain instances an advantage can be gained by using different solvents in the same cell. From the results shown and described herein, it can be seen that it is possible to obtain the necessary optical depth either by methanol or acetone alone or by methanol with a by mixture of 20 to 30 percent of acetone as the solvent. Methanol and acetone can be mixed in any ratio and the differences in their shifts of the extinction curves are negligibly small.

Although the invention has been illustrated and described in foregoing specification and graphs in terms of preferred embodiments thereof, the invention is not limited to these embodiments or to the particular uses mentioned. It will be apparent to those skilled in the art that my invention can be practiced utilizing other related compounds and combinations to produce the desired narrow passband filters. Although, the disclosed filters are especially useful for experimental investigations of monochromatic surface photometry of galactic nebulae, other equally significant utilization can be made of the unique filters herein disclosed.

It should be understood that various changes, alterations, modifications and substitutions, particularly with respect to the materials and solvents used, can be made in elements without departing from the true spirit and scope of the appended claims.

Having thus described my invention, what I claim and desire to secure by letters patent of the United States is;

1. A narrow passband liquid dye filter comprising a thin layer of a solution contained between Pyrex glass plates, said solution consisting essentially of the compound glutacondiethylimid-perchlorate in methanol and being sufficiently concentrated to transmit in the range of $\lambda 3,300$ to $\lambda 3,800$ A.

2. The liquid dye filter defined in claim 1 wherein an amount of 1.2.3.6.7.8-hexahydro-pyrene is added to said solution in sufficient quantity such that the highest gradient of extinction occurs at $\lambda 3,350$ A.

3. The liquid dye filter defined in claim 2 wherein an amount of trans-stilbene is added to the solution in sufficient quantity to cover the double minimum of extinction of the hexahydro-pyrene around $\lambda 3,250$ A.

* * * * *